United States Patent
Wada (10) Patent No.: US 12,039,309 B2
(45) Date of Patent: Jul. 16, 2024

(54) INFORMATION PROCESSING APPARATUS, METHOD OF ACTIVATING AN APPLICATION AND STORAGE MEDIUM

(71) Applicant: Canon Kabushiki Kaisha, Tokyo (JP)

(72) Inventor: Keisuke Wada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 17/386,865

(22) Filed: Jul. 28, 2021

(65) Prior Publication Data
US 2022/0035613 A1    Feb. 3, 2022

(30) Foreign Application Priority Data

Jul. 29, 2020  (JP) ................................ 2020-128510

(51) Int. Cl.
*G06F 8/61* (2018.01)
*G06F 21/51* (2013.01)
*H04L 9/32* (2006.01)

(52) U.S. Cl.
CPC ............... *G06F 8/61* (2013.01); *G06F 21/51* (2013.01); *H04L 9/3236* (2013.01)

(58) Field of Classification Search
CPC . G06F 8/61; G06F 21/51; G06F 9/445; H04L 9/3236
See application file for complete search history.

(56) References Cited

U.S. PATENT DOCUMENTS 10,032,042 B1 * 7/2018 Eckel ................... G06Q 30/018
10,535,005 B1 * 1/2020 Badr ...................... G06F 3/0482
2005/0005098 A1 * 1/2005 Michaelis ............. G06F 21/121
  713/156
2013/0111328 A1 * 5/2013 Khanna ................. G06F 16/972
  715/234
2017/0371686 A1 * 12/2017 Shiotani ................ G06F 3/1205
2018/0336049 A1 * 11/2018 Mukherjee ................ G06F 8/61
(Continued)

FOREIGN PATENT DOCUMENTS

JP    2015501496 A    1/2015
JP       6219296 B2   10/2017
WO    2013067000 W    5/2013

OTHER PUBLICATIONS

Japanese Office Action issued May 27, 2024 in counterpart Japanese Patent Appln. No. 2020-128510.

*Primary Examiner* — Dao Q Ho
(74) *Attorney, Agent, or Firm* — Venable LLP (57) ABSTRACT

At least one processor cause an information processing apparatus to act as the following units. A first installation unit installs a first application. A second installation unit installs a second application for activating the first application. An acquisition unit acquires identification information unique to the first application installed by the first installation unit. An acceptance unit accepts a request for activation of the first application which uses a deep link. A first determination unit, in a case where the acceptance unit accepts a request for activation, determines whether or not to activate, by the second application, the first application by using the identification information acquired by the acquisition unit. An activation unit activates, by the second application, the first application based on a result of the determination by the first determination unit.

15 Claims, 6 Drawing Sheets

(56) References Cited

U.S. PATENT DOCUMENTS

| | | | |
|---|---|---|---|
| 2019/0163883 A1* | 5/2019 | Savanah | H04L 9/0637 |
| 2019/0295439 A1* | 9/2019 | Odell | G06F 3/0484 |
| 2020/0252413 A1* | 8/2020 | Buzbee | G06F 9/452 |
| 2022/0035613 A1* | 2/2022 | Wada | G06F 8/61 |

* cited by examiner

INFORMATION PROCESSING APPARATUS, METHOD OF ACTIVATING AN APPLICATION AND STORAGE MEDIUM

BACKGROUND

Field

The present disclosure relates to an information processing apparatus, a method of activating an application, and a storage medium.

Description of the Related Art

There are cases where, in an information processing apparatus such as a personal computer (PC) or a smart phone, guidance is performed from a browser to a specific application. For example, in digital marketing, a business or the like may retain a user by guiding the user from a browser to an application provided by the company. By guiding the user from a browser to an application, there is a benefit that it is possible to flexibly perform independent marketing measures such as push notifications. Also, in a case where a complicated operation such as editing a photo or creating a photo book is performed, for example, guidance from a browser to a dedicated application is given because it is difficult to operate a web application running on the browser.

A deep link is given as a technique for guidance from a browser to an application. A deep link is a link that allows a direct transition from a browser, a display screen of mail software, or the like to a specific screen of an application. By applying a deep link to emails, web advertisements, and the like, it is possible activate a relevant application and guide a user to a specific screen by one click (as referenced in Japanese Patent No. 6219296, for example).

SUMMARY

According to one embodiment of the present disclosure, there is provided an information processing apparatus, comprising: at least one processor causing the information processing apparatus to act as: a first installation unit configured to install a first application; a second installation unit configured to install a second application for activating the first application; an acquisition unit configured to acquire identification information unique to the first application installed by the first installation unit; an acceptance unit configured to accept a request for activation of the first application which uses a deep link; a first determination unit configured to, in a case where the acceptance unit accepts a request for activation, determine whether or not to activate, by the second application, the first application by using the identification information acquired by the acquisition unit; and an activation unit configured to activate, by the second application, the first application based on a result of the determination by the first determination unit.

According to another embodiment of the present disclosure, there is provided a method of activating an application, the method comprising: installing a first application; installing a second application for activating the first application; acquiring identification information unique to the first application installed in the installing the first application; accepting a request for activation of the first application which uses a deep link; determining, in a case where the request for activation is accepted, whether or not to activate, by the second application, the first application by using the identification information acquired in the acquiring; and activating, by the second application, the first application based on a result of the determining.

According to still another embodiment of the present disclosure, there is provided a non-transitory computer-readable storage medium storing a program for enabling a computer to function as: a first installation unit configured to install a first application; a second installation unit configured to install a second application for activating the first application; an acquisition unit configured to acquire identification information unique to the first application installed by the first installation unit; an acceptance unit configured to accept a request for activation of the first application which uses a deep link; a first determination unit configured to, in a case where the acceptance unit accepts a request for activation, determine whether or not to activate, by the second application, the first application by using the identification information acquired by the acquisition unit; and an activation unit configured to activate, by the second application, the first application based on a result of the determination by the first determination unit.

Further features of the present disclosure will become apparent from the following description of exemplary embodiments (with reference to the attached drawings).

DESCRIPTION OF THE EMBODIMENTS

In recent years, various applications have become useable, and there is a need for appropriate application activation methods.

An embodiment of the present disclosure provides a technique for determining an activation target application and deep linking without using an OS function.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Hardware Arrangement>

Figure 1:
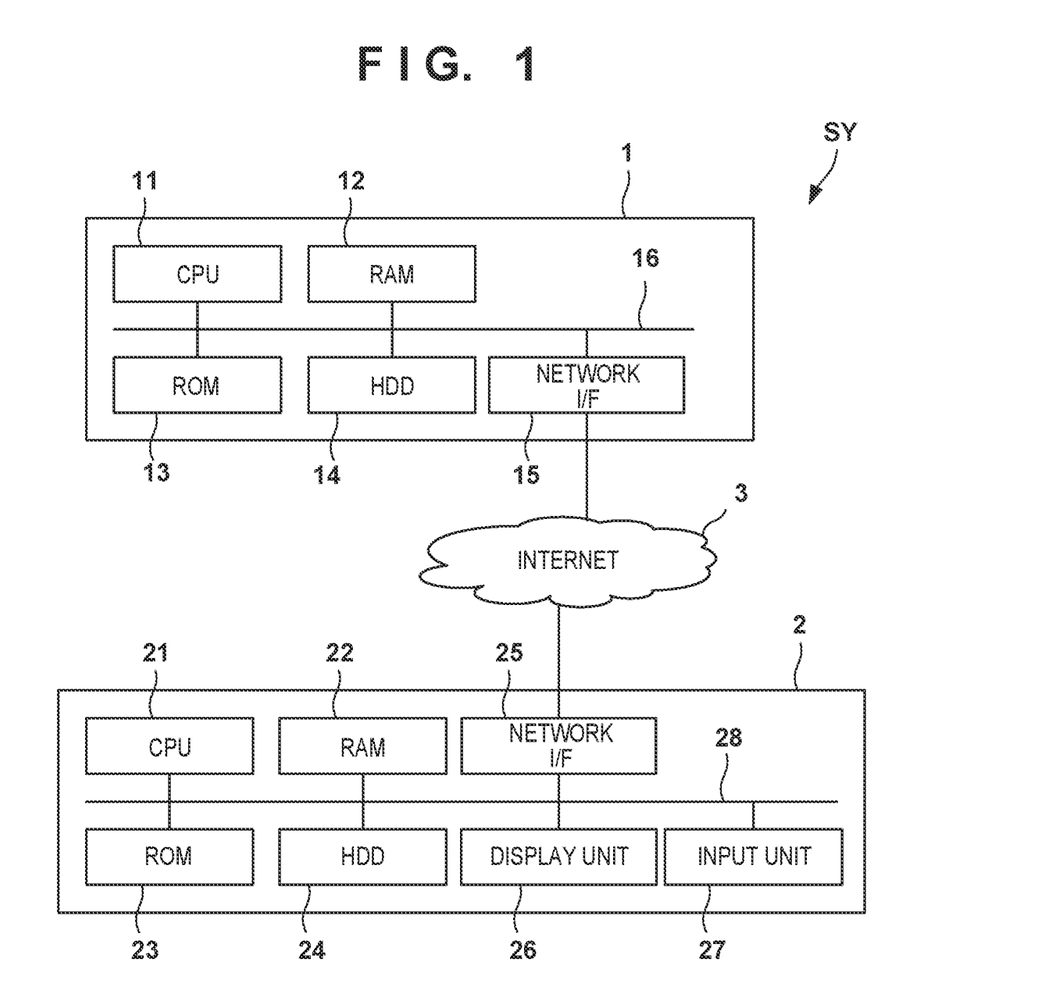
FIG. 1 is a view illustrating a hardware configuration example of a system according to an embodiment.

FIG. 1 is a view illustrating a hardware configuration example of a system SY according to an embodiment. The system SY is roughly classified to be configured by including a server 1 and a client 2. The server 1 and the client 2 communicate with each other via the Internet 3.

The server 1 is an information processing apparatus, has a CPU 11, a RAM 12, a ROM 13, a hard disk drive (HDD) 14, and a network interface (I/F) 15, and these are connected via a system bus 16 so as to be able to communicate with each other. The CPU 11 comprehensively controls operation of the server 1. For example, the CPU 11 realizes various functions of the server 1 by reading and executing a program stored in the RAM 12, the ROM 13, the HDD 14 for the like. The RAM 12 is a volatile storage area and is used as a work memory of the CPU 11, for example. The ROM 13 is a nonvolatile storage area and stores various control programs such as an operating system program (OS) and various data and the like necessary for executing the functions of the server 1, for example. The HDD 14 is a nonvolatile storage area and stores various application programs, data, user information, device information, and the like, for example. The network I/F 15 connects to the system bus 16 and performs input and output of information via a network. In the present embodiment, the network I/F 15 performs communication with an external apparatus via the Internet 3. Also, the network I/F 15 connects to a network such as a LAN (Local Area Network) (not shown) and may perform communication with the external apparatus. Note that although one CPU 11 is illustrated in the present embodiment, a plurality of CPUs may be arranged and these may perform processing while appropriately cooperating.

In the case of the present embodiment, the server 1 is a web server. The server 1 is a static web server, and responds to requests of the client 2 with web content. HTML, XML, CSS, JAVASCRIPT (registered trademark), images, and the like are possible examples of web content.

The client 2 is an information processing terminal represented by a PC, smartphone, or the like. The client 2 has a CPU 21, a RAM 22, a ROM 23, a hard disk drive (HDD) 24, a network I/F 25, a display unit 26, and an input unit 27, and these are connected via a system bus 28 so as to be able to communicate with each other. The CPU 21, the RAM 22, the ROM 23, the hard disk drive (HDD) 24, and the network I/F 25 may have the same configuration as the CPU 11, the RAM 12, the ROM 13, the hard disk drive (HDD) 14, and the network I/F 15, respectively. The display unit 26 is, for example, a liquid crystal display and displays various user interface screens. The input unit 27 accepts input operations made by the user. The input unit 27 may be a pointing device such as a mouse, a keyboard, a touch panel, or the like, for example.

<Software Arrangement>

Figure 2:
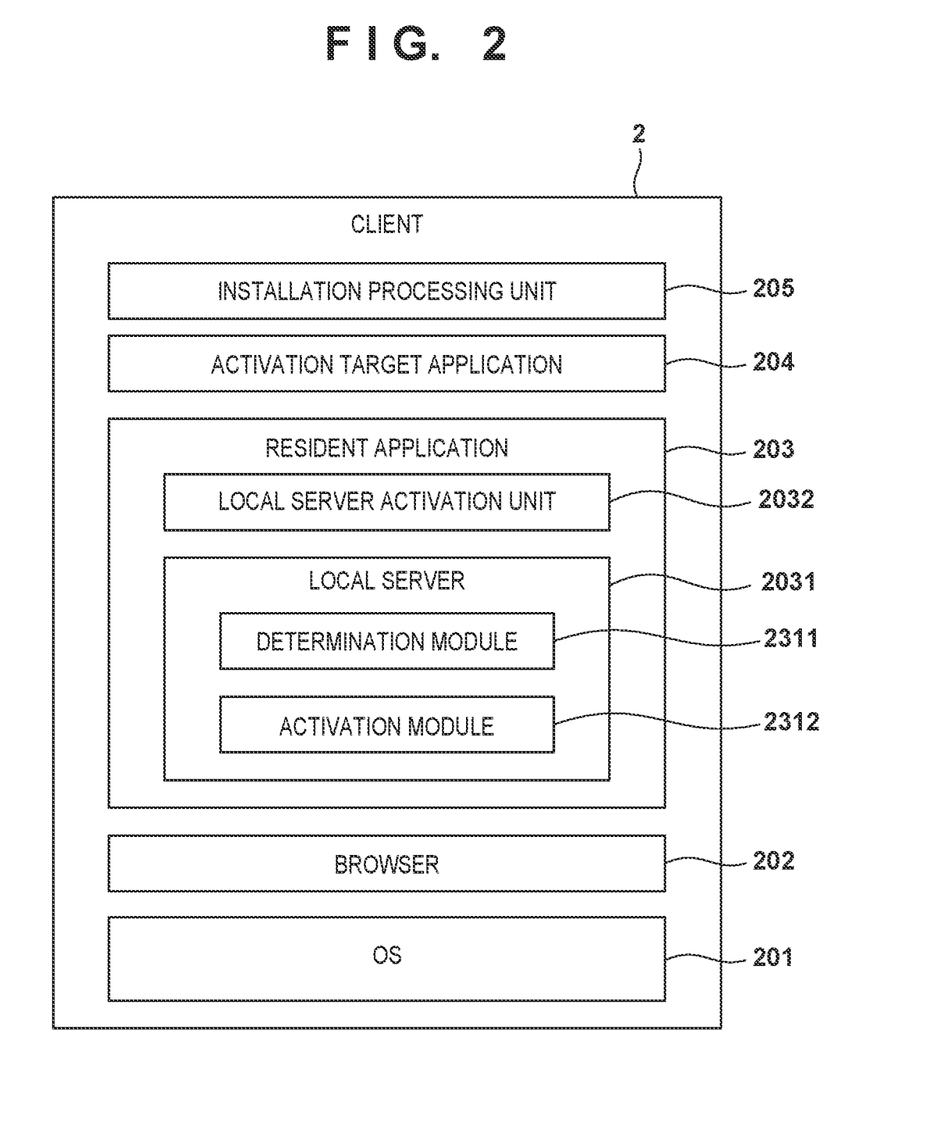
FIG. 2 is a view illustrating a configuration example of a client software.

FIG. 2 is a view for describing an example of a software configuration of the client 2. FIG. 2 illustrates a functional block of software realized by the CPU 21 reading and executing a program stored in the ROM 23, HDD 24, or the like. In the present embodiment, the client 2 includes an operating system (an OS hereinafter) 201, a browser 202, a resident application 203, an activation target application 204, and an installation processing unit 205.

The OS 201 is a software for controlling operation of the whole client 2. Software or the like that controls PC operations such as WINDOWS (registered trademark) and MAC OS (registered trademark) are given as examples of the OS 201.

The browser (Web browser) 202 is an application for utilizing a web service provided by an external system connected through the network. In the present embodiment, the browser 202 communicates with the server 1 by using HTTP (Hypertext Transfer Protocol) communication and acquires web content from the server 1. For example, the browser 202 transmits a request in accordance with an HTTP protocol to the server 1 and receives a response to that request. Also, the browser 202 analyzes the received response, displays an operation screen to the display unit 26, and processes JavaScript (registered trademark) (a script) included in the received response. In the script, a plurality of instructions may be included for executing processing.

The resident application 203 (the application 203, hereinafter) determines the activation target application 204 (the application 204, hereinafter) described later, and is an application for activation. Note, the resident application 203 is an application automatically activated based on the power of the client 2 being turned on and the OS 201 being activated. In the embodiment, the application 203 is installed at the same time as the application 204. Also, the application 203 is an application activated even when the application 204 is not activated. The application 203 includes a local server 2031 and a local server activation unit 2032 which activates the local server 2031.

The local server 2031 is a local web server that can be accessed from the browser 202 and the like within the client 2, and includes a determination module 2311 and an activation module 2312. The local server 2031 holds one or a plurality of ephemeral ports and is accessed from the browser 202. For example, the browser 202 requests web content to the local server 2031. According to a given aspect, the application 203 builds the local server 2031 on the client 2 which is an information processing apparatus.

The determination module 2311 determines the existence or absence of the activation of the application 204. Specifically, the determination module 2311 determines whether or not the application may activate the application 204 based on the identification information that identifies the application 204. For example, the determination module 2311 determines that the application may activate the application 204 in a case where the application 204 has been tampered by an attacker or the like and it could be confirmed that it was not an application that was installed fraudulently.

A hash value of the application 204 may be included, for example, in the identification information used at a time of the determination by the determination module 2311. In the embodiment, the hash value of the application 204 is included in a download file of the application 203. When the application 203 is installed to the client 2 at the same time as the application 204, the determination module 2311 stores the hash value of the application 204 included in the download file to a memory such as the ROM 23.

Also, information such as the version of the application 204 may be included in the identification information used at a time of the determination by the determination module 2311. For example, even in a case where it is confirmed that the application 204 is not fraudulent, the determination module 2311 may determine not to activate the application 204 when the application 204 is not the most recent version. In such a case, the browser 202 may display a download page for the application of the most recent version based on the determination result of the determination module 2311.

The activation module 2312 is a module for activating the application 204. For example, the activation module 2312 causes the application 204 to activate based on the determination module 2311 determining that the application 204 may be activated.

Also, the application 204 is an application targeted for activation by the activation module 2312 of the application 203. The application 204 is an application for realizing a service that a business or the like provides, and is activated by a deep link, for example. In the embodiment, the application 204 may be an application for performing editing of photos, creation of photo books, or the like. Also, the application 204 may be an application for purchasing products that a business or the like sells. Note, original data used for a calculation of the hash value of the application 204 is included in the download file of the application 204. The original data is data generated by building the application 204, for example.

The installation processing unit 205 executes installation processing of the previously described the application 203 and the application 204.

<Operation Example>

As a method of providing a deep link in a desktop application, there is a method of associating a URL (UNIFORM RESOURCE LOCATOR) used for uniquely designating a web page or the like on the Internet with the application. As a specific example, there are cases where an independently created custom URL scheme which is for a head portion of a URL is used (such a URL scheme is referred to as a custom URL scheme). For example, a custom URL scheme such as "MAP: //" used in a map application is registered in the operating system or browser and designated as an application handler. By this, when access to the registered URL scheme destination is attempted, the relevant application handler is started and the application is activated. Also, in another the specific example, the operating system (OS) performs verification of a host associated with a URL described in the application file, and in a case where the verification succeeds, establishes the URL described in the file as the handler. Also, in a case where the URL by which access is attempted is stored in the OS as a handler, the OS activates the application and displays a specific screen. However, in a method in which a custom URL is used, in a case where an application which holds the same custom URL scheme is installed by an attacker or the like, the user may end up activating an application installed by the attacker. In other words, it is not possible to determine whether the application to be activated is not fraudulently installed and the like. Also, with a method in which the OS associates and manages the application and the URL, execution is impossible if the mechanism has not been prepared in the OS. Accordingly, in the present embodiment, the application 204 to be activated is determined based on the operation below and is activated.

Figure 3:
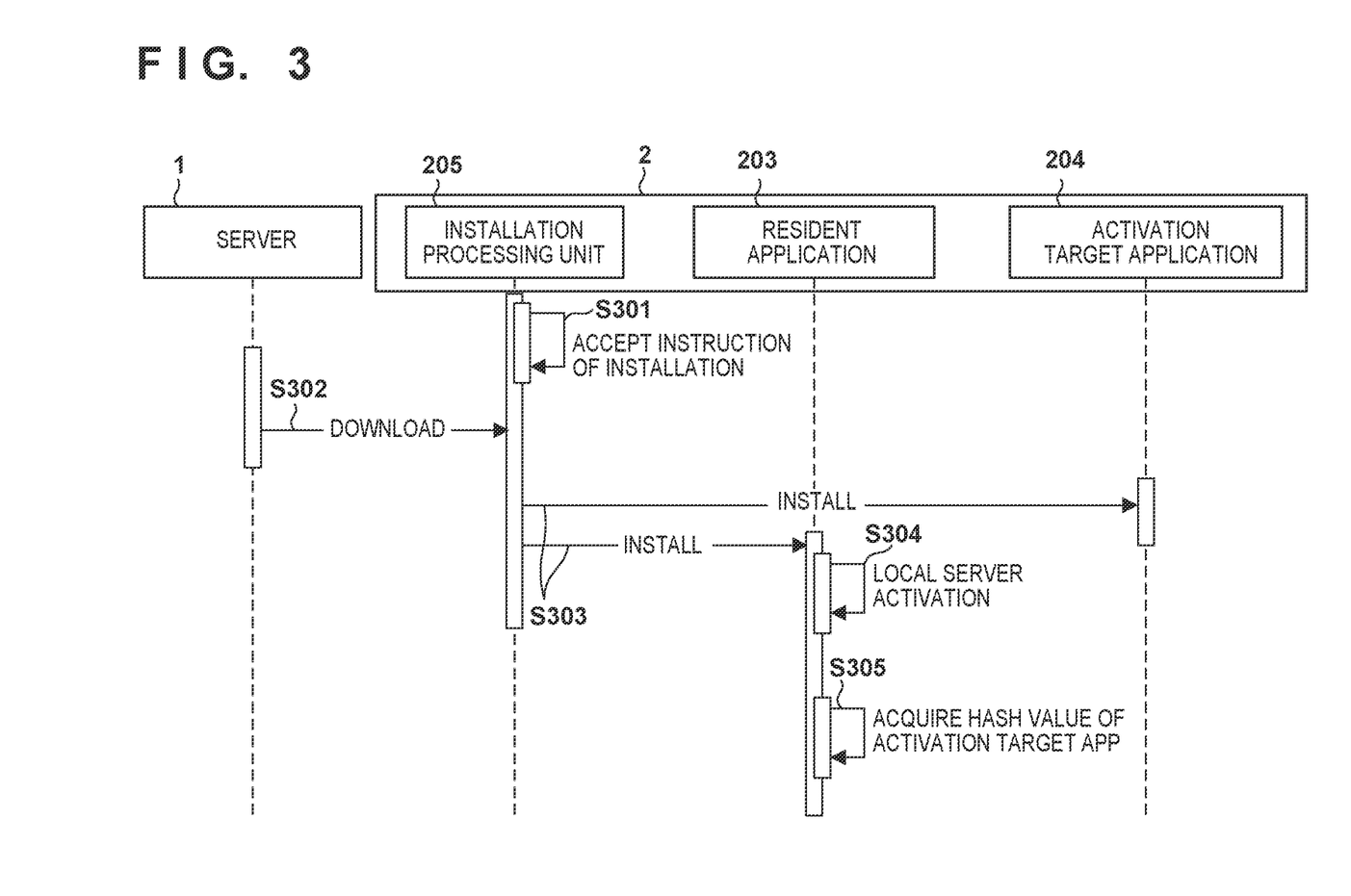
FIG. 3 is a sequence diagram for describing operation of the system.

FIG. 3 is a sequence diagram describing an operation of the system SY when the application 203 and the application 204 are installed to the client 2.

In step S301, the installation processing unit 205 accepts from the user an instruction to install the application 203 and the application 204. For example, by the user selecting, by the input unit 27, a link for installation execution on the web page that the browser 202 displays, the installation processing unit 205 accepts an instruction from the user.

In step S302, the installation processing unit 205 downloads installation files for the application 203 and the application 204 from the server 1. For example, the installation processing unit 205 requests the installation files for the applications to the server on the web based on the URL of the link on the browser 202 that the user selected in step S301. Note, in the present embodiment, although the installation processing unit 205 downloads files from the server 1, the installation processing unit 205 may download files from a server on a network other than the server 1.

In step S303, the installation processing unit 205 installs the application 203 and the application 204.

In step S304, the local server activation unit 2032 of the resident application 203 activates the local server 2031. In step S305, the local server 2031 of the resident application 203 acquires the hash value of the activation target application 204 from a memory such as the ROM 23.

Note, although the application 203 and the application 204 are installed simultaneously in the present embodiment, they also need not be installed simultaneously. For example, in a case where the application 204 is an application for a photo book creation, the application 203 may be installed with a driver of a product such as a printer when the client 2 is installed. Also, the application 204 may be downloaded from a web site of a business or the like that sells a product such as a printer, and then may be installed.

Also, the following configuration can be utilized in a case where the timings of the installation of the application 203 and the application 204 differ. In other words, when the application 203 is installed to the client 2 and the local server 2031 activates, the local server 2031 may confirm whether or not the application to be activated has been installed to the client 2. Also, in a case where the application to be activated has been installed to the client 2, the local server 2031 may acquire the hash value from the application to be activated. Also, in a case where a new application is installed during activation, the local server 2031 confirms whether or not the application is to be activated by the local server 2031, and may acquire a hash value of the application if it is to be activated.

Note, in a case where the application 203 and the application 204 are simultaneously installed, these may be the same application process or may be different application processes.

Figure 4:
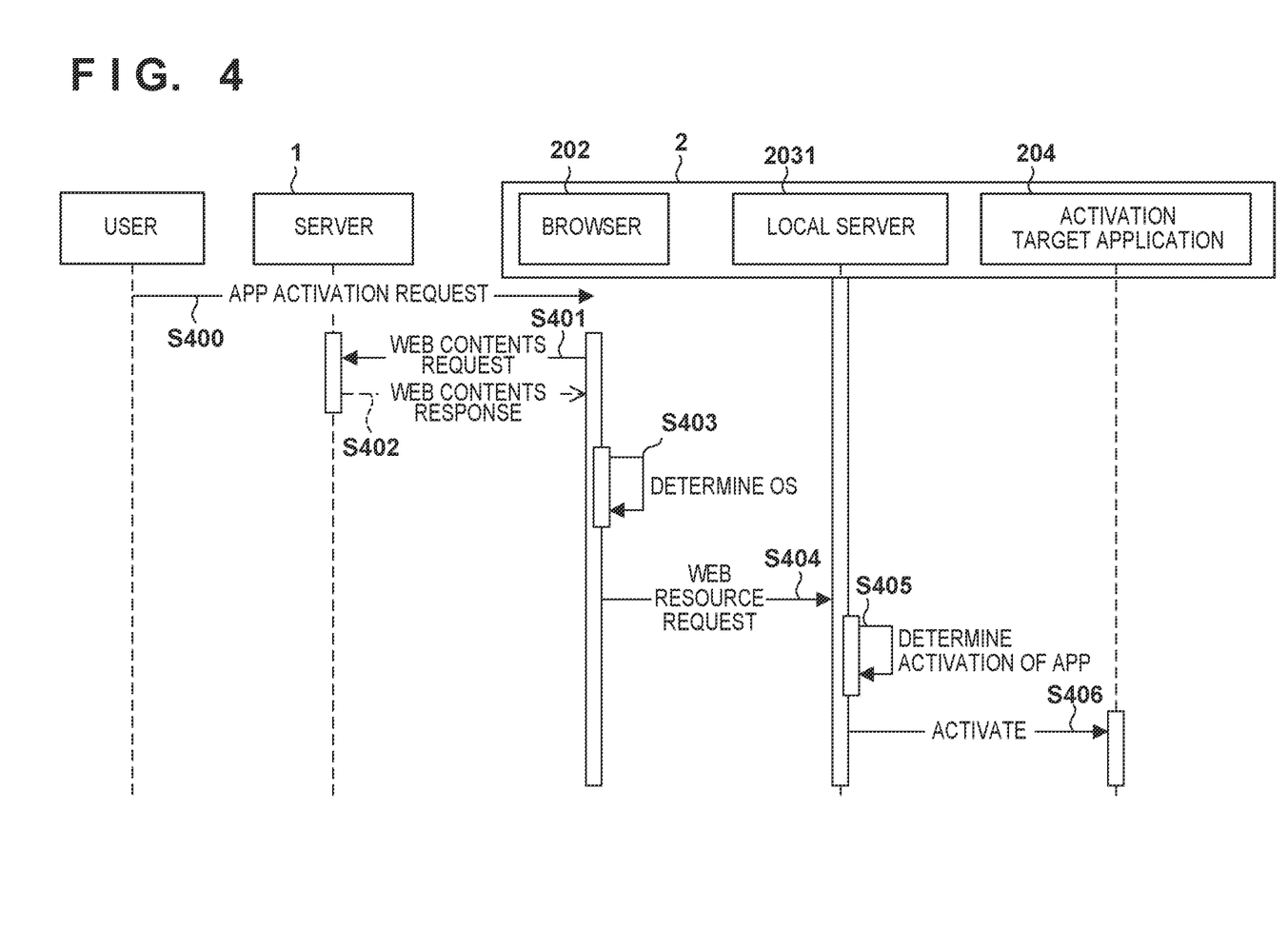
FIG. 4 is a sequence diagram for describing operation of the system.

FIG. 4 is a sequence diagram for describing operation of the system SY when the application 204 is activated. Note, the operation illustrated in the sequence diagram of FIG. 4 indicates operations in a state where the application 203 and the application 204 are installed on the client 2 according to the operation of FIG. 3.

Figure 6:
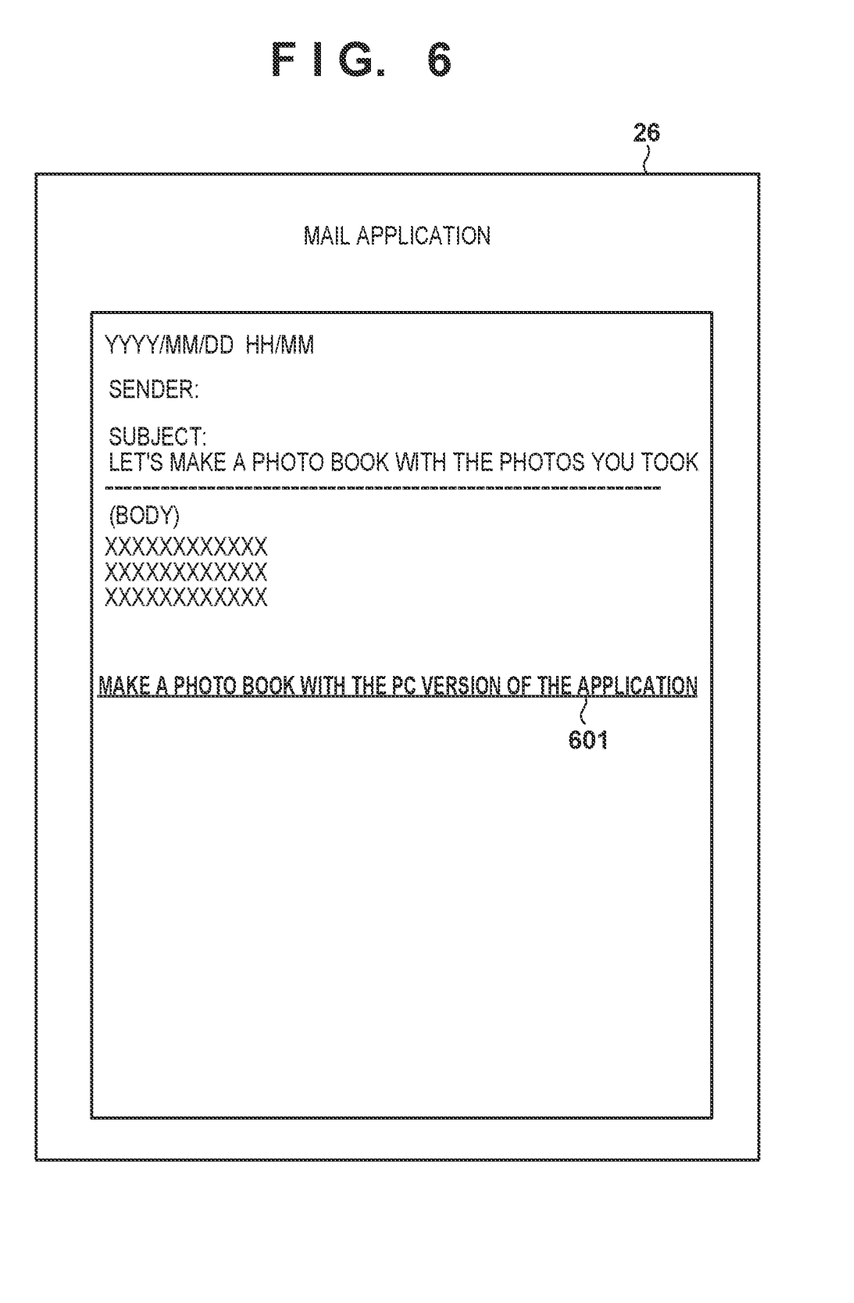
FIG. 6 is a view illustrating one example of an app activation link.

In step S400, the user makes an activation request for the application 204. For example, the user selects an app activation link by the input unit 27. Here, an app activation link is a deep link for activating the application 204 and is a hyperlink described in an email or a website, for example. FIG. 6 is a diagram showing one example thereof, and shows a configuration example of a screen in a case where an email about campaign information transmitted by a business operator or the like providing the application 204 is displayed on the display unit 26. In this example, the app activation link 601 called "Make a photo book with the PC version of the application" is described in the body of the campaign email. In other words, in a case where the user clicks the app activation link 601 with a mouse or the like, the operation illustrated by the sequence diagram of FIG. 4 is started.

In step S401, the browser 202 makes a request for the web content to the server 1. The web content is made from resources such as HTML, JAVASCRIPT (registered trademark), CSS, and the like. The browser 202 executes determination processing and the like of the OS described later by reading such a resource.

In step S402, the server 1 responds to the web content request from the browser 202. In other words, the server 1 transmits content corresponding to the request by the browser 202 to the browser 202. The browser 202 receives the web content transmitted from the server 1.

In step S403, the browser 202 determines the OS by an OS determination module embedded in the web content received from the server 1. As one example, the OS determination module performs determination of the OS by reading a program called a user agent from JAVASCRIPT (registered trademark). This determination, for example, is performed based on whether the OS can install the application 203 or whether the OS can execute subsequent processing or the like.

In step S404, the browser 202 makes a web source request for activating the application 204 to the local server 2031. In the present embodiment, the browser 202 requests access of the resource to the local server 2031 which is an origin different from the server 1 by using CORS (CROSS-ORIGIN RESOURCE SHARING). Here, CORS (cross-origin resource sharing) is a mechanism for instructing a browser to provide access authority to a selected resource within a different origin with respect to the browser which is operating on a certain origin. Generally, the same origin policy is applied to the browser, and Web content loaded from one origin is restricted such that web content from other origins cannot be accessed. However, by using CORS, the browser will be able to access different origins. In the present embodiment, the browser 202 requests resource access to the local server 2031 by using an XMLHttpRequest, for example.

Here, communication between the browser 202 and the local server 2031 is performed by using a predetermined port. For example, when the application 203 is installed on the client 2, the local server activation unit 2032 activates the local server 2031 as described above. When the local server 2031 activates, the local server 2031 enters a stand-by state in which it opens a specific port (assumed to be port number A) and waits for a connection from the outside.

Note, in a case where another application or service enters the stand-by state on the port number A, the local server 2031 cannot enter the stand-by state on that port. For this reason, in a case where the port number A is already in use, the local server 2031 opens another port and puts it in the stand-by state. Accordingly, by adding a mechanism in which the local server 2031 opens multiple ports and puts them in the stand-by state, it becomes possible for an open port to be found and the stand-by state to be entered even if other applications or services are using the port.

Also, in the present embodiment, in step S402, the information received from the server 1 by the browser 202 also includes the port information that the local server 2031 may be standing-by for. For this reason, the browser 202 searches for a port that returns a normal response among those ports, and performs communication with the local server 2031. Here, a normal response may be a response indicating that a success has returned from the local server 2031. Note, in the present embodiment, although an example of searching for an open port from a plurality of ports and performing communication has been described, limitation is not made to this, and communication may be performed using only one port. However, in a case where communication is performed using only one port, when that port is already being used by another application or service, communication cannot be performed between the browser 202 and the local server 2031.

In step S405, the determination module 2311 of the local server 2031 determines whether or not to activate the application 204. For example, the determination module 2311 acquires the original data used for the calculation of the hash value from the application 204 that will be activated. Then, the determination module 2311 acquires the hash value by calculating this original data with a specific algorithm. By this, unless the application 204 to be activated is fraudulently installed by an attacker or the like, the hash value stored in the memory or the like in step S305 matches the hash value calculated this time. On the other hand, in a case where the application 204 is changed, for example, by an attacker or the like, the hash value is calculated by using data generated by the changed application 204 being built. In such a case, since the data used for the calculation is data which is different from the original data described above, the hash value calculated in step S405 does not match the hash value stored in step S305.

The determination module 2311 compares the calculated hash value with the hash value stored in the memory or the like and if they match, determines that the application 204 may be activated. On the other hand, in a case where the calculated hash value does not match with the hash value stored in the memory or the like, there is a possibility that the application that will be activated has been fraudulently installed and tampered with by an attacker or the like. For this reason, if the determination module 2311 compares the calculated hash value with the hash value stored in the memory or the like and they do not match, the determination module 2311 determines to not activate the application 204.

Note, in the present embodiment, although it is determined whether or not to activate an app depending on the hash value of the application 204, determination may be performed depending on a unique ID or the like attached to the application 204. In such a case, the determination module 2311 may perform determination by comparing an ID of the application 204 stored in advance in the memory or the like with an ID of the application 204 acquired when the application 204 will be activated.

In step S406, the determination module 2311 of the local server 2031 will activate the application 204 in a case where it determined that the application 204 will be activated in step S405.

<Example of Client Processing>

Figure 5:
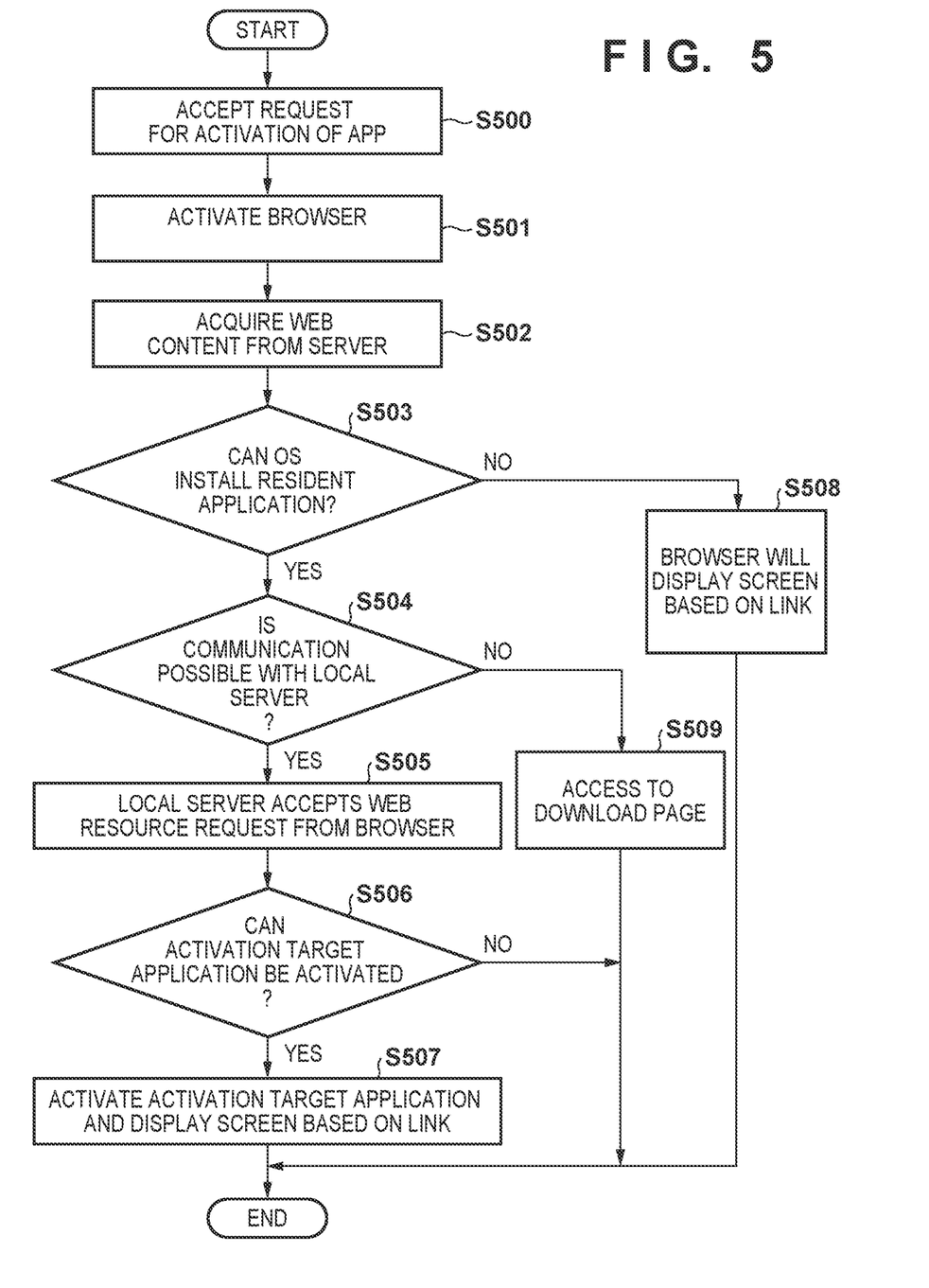
FIG. 5 is a flowchart for illustrating an example of client processing.

FIG. 5 is a flowchart illustrating an example of the processing of the client 2. The present flowchart illustrates processing by each functional block (with reference to FIG. 2) of the software realized by the CPU 21 reading and executing a program stored in the ROM 23, the HDD 24, or the like.

In step S500, the OS 201 accepts a request for activation of the application 204 from the user. Specifically, the OS 201 accepts a selection by the user for the app activation link via the input unit 27. In step S501, the OS 201 activates the browser 202.

In step S502, the browser 202 acquires the web content from the server 1. This step corresponds to step S401 and step S402 of FIG. 4. As described in FIG. 4, the browser 202 receives the web content (HTML, JAVASCRIPT (registered trademark), or the like) in a form in which the server 1 responds to the request from the browser 202. Note, in the present embodiment, the following programs may be included in the web content that the browser 202 receives. The browser 202 performs processing in accordance with the following programs.

(1) A program for determining whether or not the OS can install the application 203
(2) A program for the browser 202 to access the local server 2031
(3) A program that determines whether or not the browser 202 has a response from the local server 2031
(4) A program for accessing a URL in which an app activation link for the browser 202 is described in a case where there is no response from the local server 2031.

(5) A program for accessing a URL describing an app activation link for the browser 202 in a case where it was determined that the OS cannot install the application 203

In step S503, the browser 202 determines whether or not the OS 201 of the client 2 is an OS on which the application 203 can be installed; this step corresponds to step S403 in FIG. 4. For example, the browser 202 performs this determination in accordance with the above described program (1) acquired in step S502. The browser 202 advances to step S503 in a case where the OS 201 determines that the application 203 can be installed, and advances to step S508 in a case where the OS 201 determines that the application 203 cannot be installed. In the present embodiment, it is determined, by using the resident application 203, whether or not the activation target application may be activated. For this reason, an environment in which the resident application 203 can be installed in necessary. For this reason, the processing of step S503 is performed.

In step S504, the browser 202 determines whether or not communication with the local server 2031 is possible, and if communication is possible, the processing advances to step S505, and if communication is not possible, the processing advances to step S507. Specifically, the browser 202 confirms whether or not there is a response from the local server 2031 in accordance with the above described programs (2) and (3) acquired in step S502. For example, as in the case illustrated by FIG. 4, the application 203 and the application 204 are already installed, and if the local server 2031 is activated, the browser 202 can communicate with the local server 2031. On the other hand, in a situation where the application 203 and the application 204 are not installed and the like, it is impossible for the browser 202 to communicate with the local server 2031.

In step S505, the local server 2031 accepts a request for a web resource from the browser 202. This processing corresponds to step S404 of FIG. 4. In other words, the local server 2031 executes the subsequent processing based on acceptance of a request relating to activation of the application 204 from the browser 202.

In step S506, the determination module 2311 of the local server 2031 determines whether or not the application 204 can be activated, and if it can be activated, the processing proceeds to step S507, and if it cannot be activated, the flowchart ends. This processing corresponds to the processing of step S405 of FIG. 4. In other words, the determination module 2311 compares the hash value of the application 204 stored in advance in the memory or the like with the hash value of the application 204 obtained by the calculation. Also, the determination module 2311 determines that the application 204 can be activated if these hash values match, and determines that the application 204 cannot be activated if they do not match. By not activating the application 204 in a case where the hash values do not match, it is possible to prevent a fraudulent application that has been installed or tampered with by an attacker or the like from activating. In other words, the local server 2031 performs verification of whether the application 204 is not a fraudulent application by an attacker or the like and may be activated.

Note, in a case where the determination module 2311 determines that activation of the application 204 is impossible (step S506: No), the local server 2031 does not activate the activation target application and causes the processing of FIG. 5 to end. Note, in a case where No is determined in step S506, there is a possibility that there is a fraudulent application. For this reason, the local server 2031 may cause the browser 202 or the like to display a warning or the like that the application 204 cannot be activated. Also, in such a case, there is a possibility that the authentic application 204 is not installed. For this reason, the local server 2031 may allow the browser 202 to perform guidance to the download page of the application 204.

In step S507, the activation module 2312 of the local server 2031 activates the application 204 and displays a screen based on the app activation link 601. In a case where processing of the present flowchart is started by the app activation link 601 illustrated in FIG. 6 being selected, the activation module 2312 activates an application for photo book creation and displays a specific screen. In other words, a deep link based on the app activation link 601 is performed.

Meanwhile, in a case where the determination in step S503 is No, the browser 202 displays a screen based on the app activation link 601 in step S508. For example, in an OS such as ANDROID (registered trademark) or IOS, the application 203 cannot be installed. In such a case, the browser 202 displays a web page based on the URL designated by the app activation link 601 or the like. Note, the browser 202 may perform guidance to a landing page for a service in which the application is introduced or the like.

Also, in a case where the determination of step S504 is No, in step S509, the browser 202 determines that the application 203 and the application 204 are not installed and performs guidance to a download page for installing these applications. Note, in addition to guidance the download page, guidance to a WEB site or the like for introducing the application 204 may be performed. Also, the URL to which the guidance is to be given may be changed depending on the type of the OS 201 and the like. For example, by adding the URL to which guidance is to be given to the end of the URL of the app activation link, that URL may be transitioned to.

"HTTPS://WWW.COMPANY.COM/?ANDROID=XXXXXX.IOSr XXXXXX. WINDOWS=.MACOS=" is given as one example of that URL. Accordingly, by connecting a character string with "?" or "&" at the end of the URL, it is possible to change the guidance destination for each OS 201. Also, instead of connecting to the end of the app activation link, information of the URL to which the guidance is to be given may be included within the web content acquired in step S502.

As described above, by virtue of the present embodiment, the determination module 2311 uses acquired identification information unique to the application 204 to perform determination of whether or not it may be activated. Also, in a case where the determination module 2311 determines that the application 204 may be activated, the activation module 2312 executes a deep link based on the app activation link 601. Accordingly, rather than using the application determination function of the OS 201, an activation target application can be determined and a deep link can be performed.

Also, in the present embodiment, the determination module 2311 performs determination by a comparison between the hash value acquired in advance when the application 204 was installed or the like with the hash value acquired by the calculation after a request for activation of the application 204 was accepted. Accordingly, it can be verified by the resident application 203 that the application 204 to be activated is not fraudulently installed or tampered with without using the OS.

Also, for example, as described previously, there is also a method for using a custom URL scheme as a method of providing a deep link. However, in this method, in a case where the same custom URL scheme is registered by a plurality of applications, a message confirming which application to activate may be displayed and the user may feel burdened. In the present embodiment, since the application is activated after the verification is performed based on the identification information unique to the application such as a hash value, such a confirmation message is not displayed. Accordingly, it is possible to reduce a possibility that the user will feel burdened and it is possible to improve usability.

OTHER EMBODIMENTS

Although a case where there is one application 204 to be activated is described in the example in the description of the above described embodiment, there may be a plurality of applications 204. In other words, the local server 2031 may perform determination of whether the application 204 may be activated based on the hash value or the like of the application 204 which accepted a request from activation from the browser 202 from among a plurality of the applications 204.

Also, in the above described embodiment, whether or not the application 204 is installed is determined by the presence or absence of a response from the local server 2031. However, the determination of whether or not the application 204 is installed is not limited to the presence or absence of the response of the local server 2031.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-128510, filed Jul. 29, 2020, which is hereby incorporated by reference herein in its entirety.

What is claimed is:

1. An information processing apparatus comprising:
at least one processor; and
at least one memory that stores a web browser, a first application, and a second application which includes a local server, wherein the second application acquires and stores
identification information unique to the first application when the second application is installed into the information processing apparatus,
wherein the at least one processor is configured to execute the local server of the second application to:
accept a request for activation of the first application with a deep link from the web browser;
compare, when the local server accepts the request for activation of the first application, the stored identification information with identification information of the first application acquired after accepting of the request; and
determine, based on a result of the comparison, whether or not the first application is to be activated; and
activate, when it is determined that the first application is to be activated, the first application so that the activated first application displays a screen corresponding to the deep link, and
wherein the first application is not activated when it is determined that the first application is not to be activated.

2. The information processing apparatus according to claim 1,
wherein the web browser executes a program included in a web content acquired from a server to determine whether or not a communication with the local server is possible, and
wherein the web browser requires an activation of the first application to the local server of the second application in a case where it is determined that the communication with the local server is possible.

3. The information processing apparatus according to claim 2, wherein the web browser performs guidance, in a case where it is determined that the communication with the local server is not possible, for installations of the first application and the second application.

4. The information processing apparatus according to claim 1, wherein installations of the first application and the second application are performed simultaneously.

5. The information processing apparatus according to claim 1, wherein the second application is a resident application.

6. The information processing apparatus according to claim 1, wherein
the local server cannot be accessed from outside of the information processing apparatus.

7. The information processing apparatus according to claim 1, wherein the identification information unique to the first application includes a hash value of the first application.

8. A method of activating an application in an information processing apparatus, the method comprising:
installing a first application into the information processing apparatus;
installing a second application into the information processing apparatus, wherein the second application includes a local server and acquires and stores
identification information unique to the first application when the second application is installed into the information processing apparatus, wherein the method further comprises, in the local server of the second application, accepting a request for activation of the first application with a deep link from a web browser, in the local server of the second application, comparing, when the local server accepts the request for activation of the first application, the stored identification information with identification information of the first application acquired after the accepting of the request, in the local server of the second application, determining, based on a result of the comparison, whether or not the first application is to be activated, and in the local server of the second application, activating the first application, when it is determined that the first application is to be activated, so that the activated first application displays a screen corresponding to the deep link, and wherein the first application is not activated when it is determined that the first application is not to be activated.

9. A non-transitory computer-readable storage medium storing a first application and a second application which includes a local server, wherein the second application causes a computer to acquire and store identification information unique to the first application when the first application and the second application are installed into the computer, wherein the local server of the installed second application causes the computer to:

accept a request for activation of the first application with a deep link from a web browser;

compare, when the local server accepts the request for activation of the first application, the stored identification information with identification information of the first application acquired after the accepting of the request, and determine, based on a result of the comparison, whether or not the first application is to be activated; and activate, when it is determined that the first application is to be activated, the first application so that the activated first application displays a screen corresponding to the deep link, and wherein the first application is not activated when it is determined that the first application is not to be activated.

10. The non-transitory computer-readable storage medium according to claim 9, wherein the web browser executes a program included in web content acquired from a server to determine whether or not communication with the local server is possible, and wherein the web browser requires an activation of the first application to the local server of the second application in a case where it is determined that the communication with the local server is possible.

11. The non-transitory computer-readable storage medium according to claim 10, wherein the web browser performs guidance, in a case where it is determined that the communication with the local server is not possible, for installations of the first application and the second application.

12. The non-transitory computer-readable storage medium according to claim 9, wherein installations of the first application and the second application are performed simultaneously.

13. The non-transitory computer-readable storage medium according to claim 9, wherein the second application is a resident application.

14. The non-transitory computer-readable storage medium according to claim 9, wherein the local server cannot be accessed from outside of an information processing apparatus including the computer.

15. The non-transitory computer-readable storage medium according to claim 9, wherein the identification information unique to the first application includes a hash value of the first application.

* * * * *